Oct. 27, 1931.         H. CHRETIEN              1,829,633
   PROCESS FOR TAKING OR PROJECTING PHOTOGRAPHIC OR CINEMATOGRAPHIC
        PANORAMIC VIEWS OR VIEWS EXTENDING IN HEIGHT
                  Filed Jan. 9, 1928          2 Sheets-Sheet 1
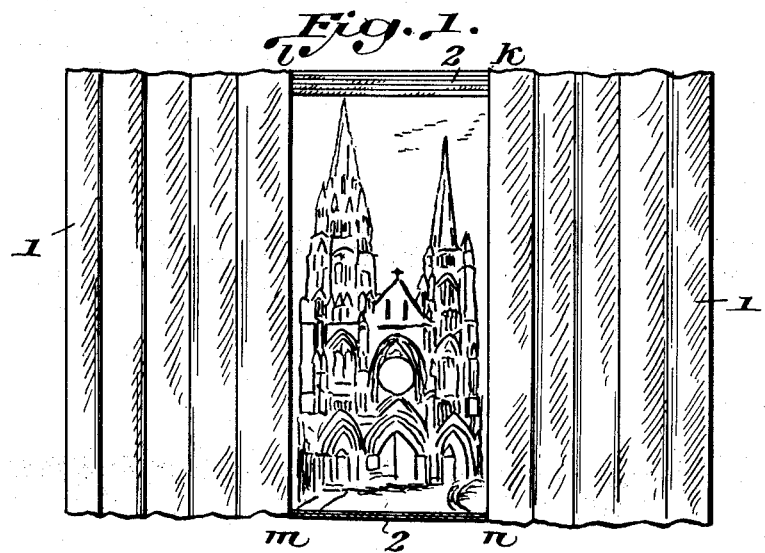
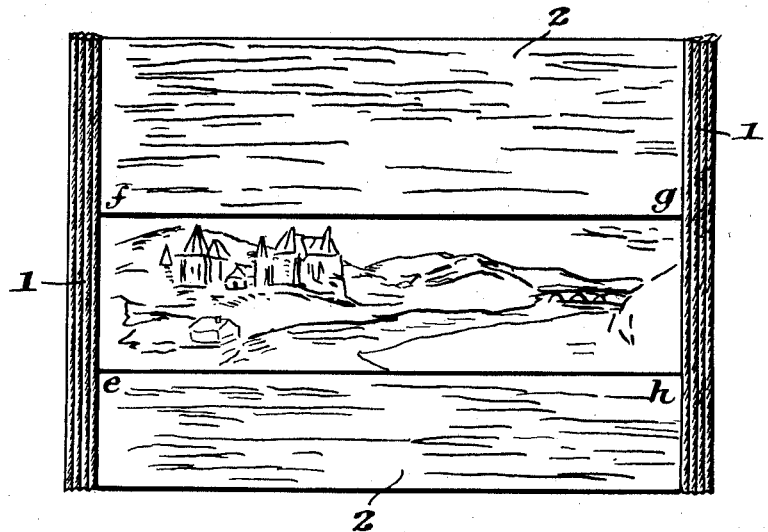
Inventor
Henri Chretien Oct. 27, 1931.　　　　　H. CHRETIEN　　　　　1,829,633
PROCESS FOR TAKING OR PROJECTING PHOTOGRAPHIC OR CINEMATOGRAPHIC
PANORAMIC VIEWS OR VIEWS EXTENDING IN HEIGHT
Filed Jan. 9, 1928　　　2 Sheets-Sheet 2
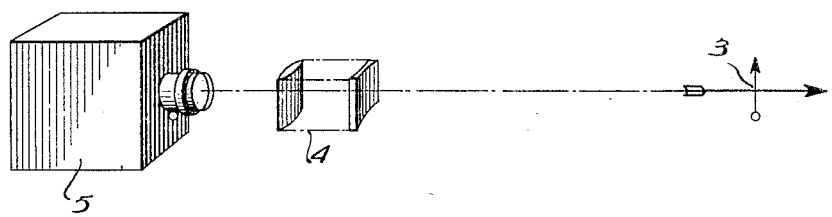
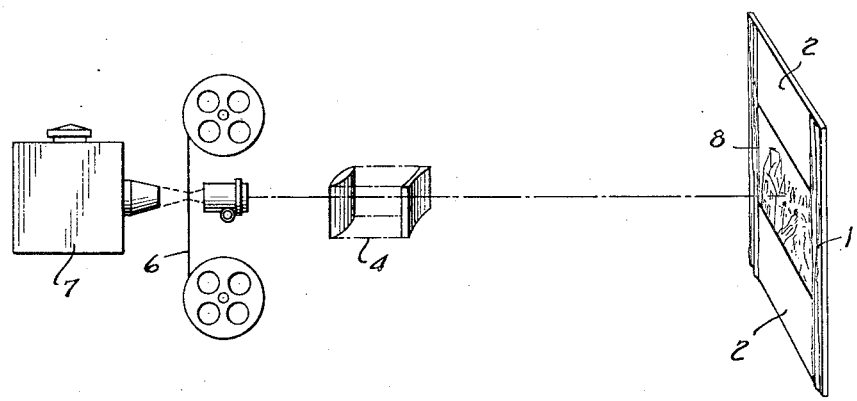
INVENTOR
*Henri Chretien.*
BY
*Bartlett Eyre Scott & Keel*
ATTORNEYS.

Patented Oct. 27, 1931

1,829,633

UNITED STATES PATENT OFFICE

HENRI CHRETIEN, OF ST. CLOUD, FRANCE, ASSIGNOR TO SOCIETE ANONYME FRANCAISE DITE SOCIETE TECHNIQUE D'OPTIQUE ET DE PHOTOGRAPHIE (S. T. O. P.), OF ST. OUEN, FRANCE

PROCESS FOR TAKING OR PROJECTING PHOTOGRAPHIC OR CINEMATOGRAPHIC PANORAMIC VIEWS OR VIEWS EXTENDING IN HEIGHT

Application filed January 9, 1928, Serial No. 245,558, and in France April 29, 1927.

The proportions universally adopted for the screens for cinematographic projections:

$$\frac{\text{height}}{\text{width}} = \frac{3}{4}$$

are incompatible with a suitable presentation of certain sceneries, such as panoramas (which require a greater width) interiors of churches, high monuments (which require a greater height).

If it is desired to impart to these views suitable proportions, it is necessary to reduce the scale and to mask on the negative the parts which are not used by the image, which is a defective solution.

Attempts have already been made to escape from this limitation—especially for panoramas—by combining a number of projection apparatuses, operating simultaneously, side by side, but this solution meets with very considerable mechanical complications, and cannot be generalized easily or rapidly.

The present invention has for its subject a method which produces a simple and immediate solution of the problem of the extension of the field of view projected, whilst preserving the normal dimensions of the negatives, without reducing the scale, without sacrificing any portion of their surface, and without resorting to the multiplication of the apparatus. It therefore renders possible the change of the shape of the frame of the views projected by means of single apparatus such as are actually in use, both for photographing the views and for projection. The method in question consists:

1. In reducing optically the space occupied by the images on a sensitized surface, by compressing them in one single direction, either in height, or in width, or in any inclined direction selected, this result being obtained by disposing, in front of the photographing objective, a special optical combination, referred to as a local anamorphoser, suitably oriented about the optical axis of the objective.

2. In restoring or protecting these images through an optical combination similar to that which has served for obtaining them and similarly directed, which has the result of re-establishing the images in their exact proportions on a screen of suitable dimensions and arrangement.

The special screen for the projection of the images obtained by carrying into effect the above process hereinafter described, constitutes an essential characteristic feature of the present invention which particularly relates to the combination of such a screen with a projection apparatus provided with the optical combination above referred to.

The invention has particularly for its object the application in order to obtain the special result referred to above, of an optical combination such for example as the local anamorphoser constituted by the optical combination described in application No. 236,330. But in the present invention, the result aimed at is different from that obtained by the invention described in the prior application, because here it is desired to produce, at each photographing of views, a single image deformed or compressed in a suitable direction, whilst the local anamorphoser is single and not multiple.

The optical combination forming this local anamorphoser is composed of two systems of cylindrical lenses arranged one behind the other in such a manner that their axial planes are in coincidence. For the purpose of reducing the chromatic and geometric aberrations of the combination, each partial system may be constituted by the association of several simple or compound cylindrical lenses, calculated according to known principles similar to those which are applied to the optical combinations symmetrical with reference to an axis.

The two partial systems into which the combination may be decomposed are adjustable, as to their mutual distance, according to the different distances of the subject from the photographic apparatus so that the anamorphosed image of the subject, seen through the anamorphoser, is formed at the same distance, a condition which precludes the introduction of astigmatism in the definitive image.

The enlargement of the anamorphoser according to its active direction is given a determined value, equal to the inverse of the coefficient by which it is desired to multiply the extension of the field in this direction; for example if the field is to be multiplied by 2½, the enlargement is taken as equal to 0.4.

The anamorphoser is adapted to be oriented, by simple rotation about the optical axis of the objective, so as to enable the photographing of views extended either in width, in height, or even obliquely.

Levels of sufficient number, suitably secured to the periphery of the anamorphoser, facilitate its rapid and exact directing in the selected direction.

The projection screen will evidently have the necessary dimensions in height and in width so as to receive the projections of greater sizes which are obtained by the anamorphoser.

However, as it is disagreeable during projections of normal dimensions to see a screen which is not filled by the image, it is advisable to mask the areas which are not used by means of dark curtains which separate in pairs so as to effect unmasking of the useful areas only at opportune times.

For a better understanding of the invention reference may be had to the accompanying drawings which illustrate one embodiment of an apparatus for practicing the invention wherein:

Fig. 1 shows a view of an image after extension in height and projected upon a screen;

Fig. 2 shows a panoramic view as it appears after projection upon a screen;

Fig. 3 illustrates diagrammatically the camera and anamorphoser arranged for taking panoramic views; and Fig. 4 illustrates diagrammatically the arrangement of the projector, anamorphoser, film and screen for projecting panoramic views.

Referring to the drawings I have shown in Figs. 1 and 2 a screen which may be used in connection with the projection apparatus. With this screen there is combined a set of two pairs of curtains of dark color 1, 1 and 2, 2. During ordinary projection, of normal size, both sets of curtains 1, 1 and 2, 2 may be used to mask only that part of the screen which is not needed for the small views, as for example the central portion of the screen. When it is desired to project the high views shown in Fig. 1 the curtains 2, 2 are opened so as to unmask the vertical extensions of the screen (Fig. 1). For panoramic views, the pair of curtains 1, 1 are opened while the curtains 2, 2 remain closed (Fig. 2).

In the taking and projection of the pictures according to the method above set forth, any suitable apparatus may be used, but the preferred apparatus is that shown in Figs. 3 and 4. This apparatus includes an ana- morphoser 4 of the character set forth in United States application Serial No. 236,330 and is placed in the path of the rays impinging upon the camera 5 from the object to be photographed shown diagrammatically at 3. The images of the panoramic object 3 are formed on the film 6 but are laterally compressed into normal dimensions thereupon. When these images are projected through the anamorphoser 4 from the projector 7, they are extended to their original proportions, as shown at 8. For the taking and projecting of vertically extending views of the type illustrated in Fig. 1, the apparatus of Figs. 3 and 4 is used but the anamorphoser is rotated through 90°; the curtains 2 being separated and the curtains 1 drawn, as shown in Fig. 1.

In the practice of the invention one first determines what portion of a view is desirable for reproduction. When such portion does not have the relative dimensions of the image space of the film, then such portion is photographed while optically compressing the image in one dimension sufficient to make it correspond to the relative dimensions of the space, and the image is thereafter projected while optically restoring it in this dimension to give it the proportions of the dimensions of said portion of the view. Projected pictures may thereby be given the dimensions best suited for framing the view without regard to the limitations imposed by the image spaces of the film.

What I claim is:

1. The art of producing projected pictures in frames of different proportions with standard films which comprises photographing views of varying amplitudes certain views being extended in one dimension only and certain others in another, and during the photographing step optically compressing the pictures of the extended views on the film in one dimension and certain others in another dimension to form on the film uniform images of predetermined dimensions and proportions of the variously extended fields of view and then optically restoring such views while projecting to their normal differently framed proportions.

2. The art of producing projected pictures in frames of different proportions with standard films which comprises photographing views, certain of which views are extended in one dimension and during the photographing optically compressing said extended views on the film in the one dimension only to form on the film uniform images of predetermined dimensions and proportions of the differently extended fields of view and then optically restoring such views while projecting to their normal proportions.

3. The improvement in the art of projected pictures which comprises first determining what portion of a view other than any having the relative dimensions of the image space of the film is desirable for reproduction, then photographing such portion while optically compressing the image in one dimension sufficiently to make it correspond to the relative dimensions of the image space, and thereafter projecting the image while optically restoring the image in said dimension to give it the dimensions of said portion of the view, whereby projected pictures may be given the dimensions best suited for framing the view without regard to the image spaces on the film.

In testimony whereof I have signed my name to this specification.

HENRI CHRETIEN.